United States Patent
Hishida et al.

(10) Patent No.: US 11,820,250 B2
(45) Date of Patent: Nov. 21, 2023

(54) SYSTEM AND METHOD FOR DYNAMICALLY OFFERING DIFFERENT DISCOUNTS ON PARKING FEE AND NOTIFYING USERS

(71) Applicant: HONDA MOTOR CO., LTD., Tokyo (JP)

(72) Inventors: Motoki Hishida, Saitama (JP); Hakaru Sadano, Saitama (JP); Hiroyuki Kanazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 190 days.

(21) Appl. No.: 17/368,870

(22) Filed: Jul. 7, 2021

(65) Prior Publication Data

US 2021/0331600 A1 Oct. 28, 2021

Related U.S. Application Data

(63) Continuation of application No. PCT/JP2019/001241, filed on Jan. 17, 2019.

(51) Int. Cl.
*B60L 53/66* (2019.01)
*B60L 53/67* (2019.01)
(Continued)

(52) U.S. Cl.
CPC ............ *B60L 53/665* (2019.02); *B60L 53/63* (2019.02); *B60L 53/64* (2019.02); *B60L 53/65* (2019.02);
(Continued)

(58) Field of Classification Search
CPC ........ B60L 53/665; B60L 53/63; B60L 53/64; B60L 53/65; B60L 53/67; B60L 55/00; B60Y 2200/90; Y02E 60/00; Y02T 90/167; Y02T 10/70; Y02T 10/7072; Y02T 90/12; Y02T 90/16; Y04S 10/126; Y04S 30/14; G06Q 50/06; G06Q 50/10
See application file for complete search history.

(56) References Cited

U.S. PATENT DOCUMENTS

| 2008/0281663 A1* | 11/2008 | Hakim | ............ | H02J 3/466 705/7.25 |
| 2010/0076825 A1* | 3/2010 | Sato | ............ | B60L 53/65 705/14.1 |

(Continued)

FOREIGN PATENT DOCUMENTS

| JP | 4426504 B2 | 3/2010 |
| JP | 2012147530 A | 8/2012 |

(Continued)

OTHER PUBLICATIONS

International Preliminary Report on Patentability for International Application No. PCT/JP2019/001241, issued by the International Bureau of WIPO dated Jun. 16, 2021.

*Primary Examiner* — Santosh R Poudel

(57) ABSTRACT

Provided is a system, including: a demand information acquisition unit configured to acquire information indicating power demand in a power network; and a setting unit configured to, based on the power demand, set a usage fee for a parking lot having a power transmission and reception facility for a vehicle having a power supply for driving to transmit and receive power to/from the power network.

17 Claims, 8 Drawing Sheets

(51) Int. Cl.
  *B60L 55/00* (2019.01)
  *B60L 53/64* (2019.01)
  *B60L 53/63* (2019.01)
  *B60L 53/65* (2019.01)

(52) U.S. Cl.
  CPC .............. *B60L 53/67* (2019.02); *B60L 55/00* (2019.02); *B60Y 2200/90* (2013.01)

(56) References Cited

U.S. PATENT DOCUMENTS

| | | | | |
|---|---|---|---|---|
| 2010/0211643 | A1* | 8/2010 | Lowenthal | B60L 53/14 |
| | | | | 709/206 |
| 2012/0296836 | A1 | 11/2012 | Hisano | |
| 2013/0013382 | A1* | 1/2013 | Alexander | G06Q 20/20 |
| | | | | 705/14.1 |
| 2013/0346308 | A1* | 12/2013 | Naito | B60L 53/68 |
| | | | | 705/41 |
| 2014/0306816 | A1* | 10/2014 | Nakamura | B60L 50/16 |
| | | | | 340/457 |
| 2015/0217657 | A1 | 8/2015 | Kang | |
| 2019/0139162 | A1* | 5/2019 | Sawada | G06Q 10/02 |

FOREIGN PATENT DOCUMENTS

| | | | |
|---|---|---|---|
| JP | 2013041324 | A | 2/2013 |
| JP | 5822434 | B2 | 11/2015 |
| JP | 2017017993 | A | 1/2017 |
| JP | 2017046557 | A | 3/2017 |

* cited by examiner

| PARKING LOT ID | DISCOUNT TARGET PERIOD | DISCOUNT SUM | APPLICATION CONDITION |
|---|---|---|---|
| P100 | 2018/9/30 15:00 ~ 2018/9/30 18:00 | ¥70/HOUR | LARGE DISCHARGEABLE AMOUNT |
| P100 | 2018/9/30 23:00 ~ 2018/9/30 07:00 | ¥40/HOUR | LARGE CHARGEABLE AMOUNT |
| P102 | 2018/9/30 12:00 ~ 2018/9/30 13:00 | ¥40/HOUR | LARGE CHARGEABLE AMOUNT |
| ⋮ | ⋮ | ⋮ | ⋮ |

*FIG. 3*

| VEHICLE ID | CONNECTION DESTINATION ID | CONNECTION START TIME | CONNECTION END TIME | POWER TRANSMISSION AND RECEPTION AMOUNT |
|---|---|---|---|---|
| V100 | P100-C01 | 2018/9/30 16:00 | 2018/10/1 18:00 | 9kWh |
| V101 | P100-C02 | 2018/9/30 17:00 | 2018/9/30 18:00 | 0kWh |
| V102 | P102-C01 | 2018/9/30 12:00 | 2018/9/30 14:00 | -12kWh |
| ... | ... | ... | ... | ... |

*FIG. 6*

SYSTEM AND METHOD FOR DYNAMICALLY OFFERING DIFFERENT DISCOUNTS ON PARKING FEE AND NOTIFYING USERS

CROSS REFERENCE TO RELATED APPLICATION

The contents of the following Japanese patent application are incorporated herein by reference:

International Application NO. PCT/JP2019/001241 filed on Jan. 17, 2019.

BACKGROUND

1. Technical Field

The present invention relates to a system and a computer-readable storage medium.

2. Related Art

There has been a known system that converts released power from a rechargeable battery of a vehicle using a parking lot to an amount of money to pay a parking fee at the parking lot (see, e.g., Patent Document 1 listed below).

PRIOR ART DOCUMENT

Patent Document

Patent Document 1: Japanese Patent Application Publication No. 2017-017993
Patent Document 2: Japanese Patent Application Publication No. 2012-147530
Patent Document 3: Japanese Patent No. 4426504
Patent Document 4: Japanese Patent No. 5822434

BRIEF DESCRIPTION OF THE DRAWINGS

FIG. 3 shows a table of an example of usage fee information including a discount sum of usage fee for a parking lot.

FIG. 6 shows a table of an example of connection history information indicating history of connection by a vehicle 30 to a power network 10.

DESCRIPTION OF EXEMPLARY EMBODIMENTS

Figure 1:
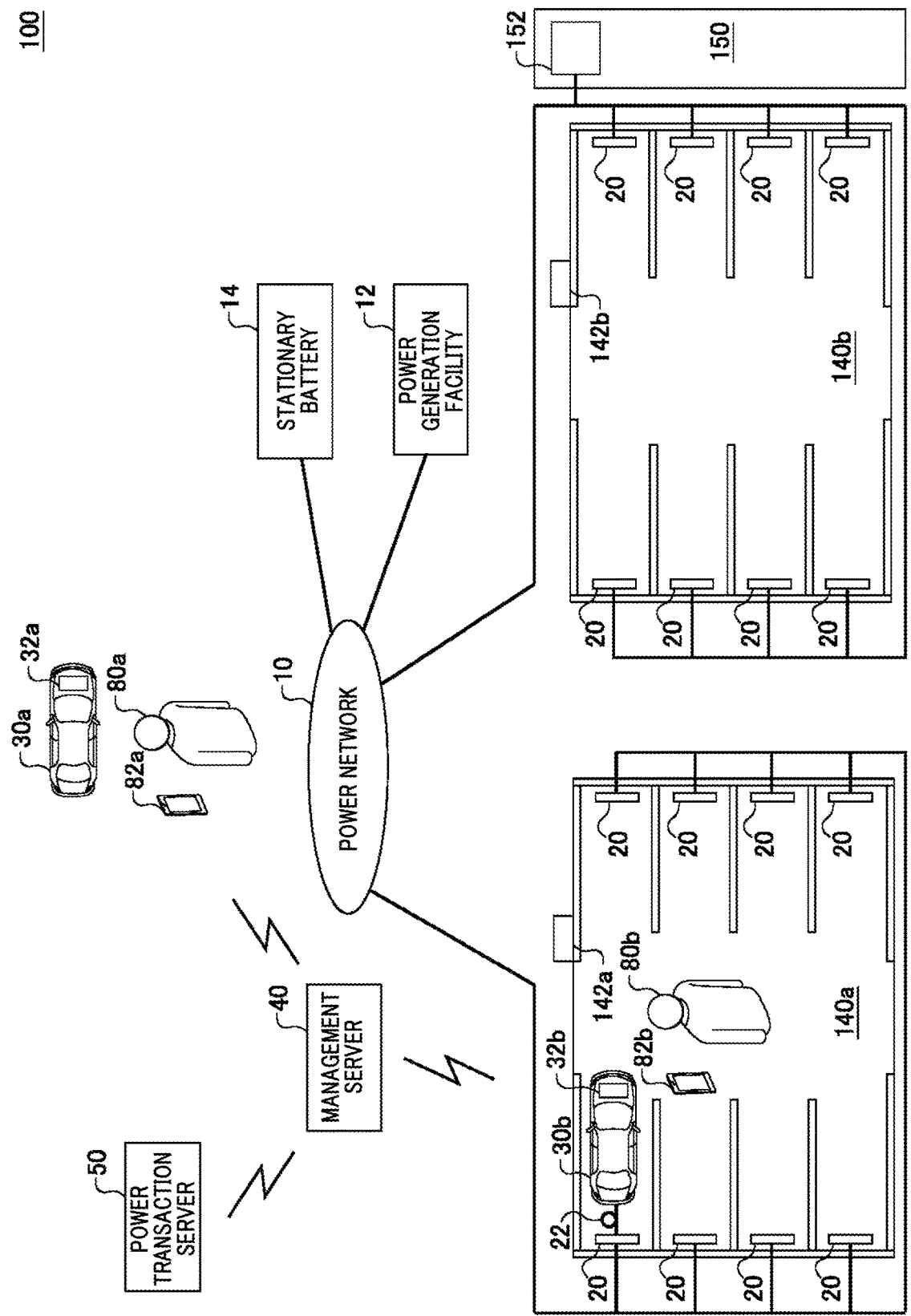
FIG. 1 shows schematically an overall configuration of a power transmission and reception system 100.

While the present invention will be described below by means of the embodiments, these embodiments below are not intended to limit the invention defined by the claims. All combinations of features set forth in the embodiments are not necessarily essential to the solutions of the present invention. In figures, the same or similar parts are denoted by the same reference numerals and redundant explanation thereof may be omitted.

FIG. 1 shows schematically an overall configuration of a power transmission and reception system 100. The power transmission and reception system 100 represents a system for performing V2G (Vehicle-to-Grid) in which a power aggregator, for example, uses batteries mounted on a vehicle to interchange power between the vehicle and a power network. The power transmission and reception system 100 controls a usage fee for a parking lot provided with a charging/discharging facility having a V2G function depending on power demand. Thereby, many vehicles are guided to be connected to the power network. Note that, in the present embodiment, the term V2G applies to at least either of the case where a vehicle discharges power to the power network or the case where a vehicle receives power from the power network.

The power transmission and reception system 100 comprises a plurality of vehicles including vehicles 30a and 30b, a stationary battery 14, a plurality of charging/discharging facilities 20, a management server 40, a power generation facility 12, and a plurality of user terminals including user terminals 82a and 82b.

A user 80a is a user of the vehicle 30a. A user 80b is a user of the vehicle 30b. Note that the users of the vehicles may be any of the owner of the vehicle, a family member of the owner, or anyone who uses the vehicle. The vehicle 30a is provided with a battery 32a. The vehicle 30b is provided with a battery 32b. The user terminal 82a is a communication terminal used by the user 80a. The user terminal 82b is a communication terminal used by the user 80b.

In the present embodiment, the plurality of vehicles including the vehicles 30a and 30b may be collectively referred to as "the vehicle(s) 30."

Also, the plurality of batteries including the batteries 32a and 32b may be collectively referred to as "the battery(ies) 32."

Note that the battery 32 is an example of a power supply for driving provided in the vehicle 30. The power supply for driving includes a power supply, such as fuel cells, that consumes fuel to produce electric energy provided to a power source of the vehicle 30. Fuels may include hydrogen, hydrocarbon fuel including gasoline, light oil, and natural gas, and alcohol fuel. The power supply for driving may be any power supply that can produce electric energy provided to the power source of the vehicle 30.

The vehicle 30 is an example of transportation equipment. The vehicle 30 represents electric vehicles or fuel cell vehicles (FCV), for example, that are provided with a power source driven by electric energy. The electric vehicles include battery electric vehicles (BEV), hybrid vehicles provided with an internal engine to provide at least a part of power, and plug-in hybrid electric vehicles (PHEV). In the present embodiment, the vehicle 30 is an electric vehicle provided with the battery 32 as the power supply for driving. In employing batteries as the power supply for driving, battery discharge corresponds to energy release from the power supply for driving, while battery charge corresponds to energy accumulation in the power supply for driving. In addition, a residual capacity of the battery corresponds to an amount of power or electricity that can be supplied by the power supply for driving.

In the present embodiment, the respective users 80a and 80b may be collectively referred to as "the user(s) 80."

The plurality of user terminals including the user terminals 82a and 82b may be collectively referred to as "the user terminal(s) 82."

The user terminal 82 may be a mobile terminal, a personal computer, or a vehicle navigation apparatus or the like, for example. The mobile terminal can include a mobile phone, a smart phone, a PDA, a tablet, a notebook computer, a laptop computer, and a wearable computer, as examples.

The management server 40 can communicate, via a communication network, with the vehicle 30, the stationary battery 14, and the user terminal 82. The management server 40 can also communicate, via the communication network, with a power transaction server 50. The communication network may include wired or wireless communication transmission paths. The communication network may include communication networks such as the Internet, a P2P network, a dedicated line, a VPN, a power line communication line, a mobile telephone line or the like.

The power network 10 can include a transmission system or distribution system of a power system, or a distribution network of a power grid. The power network 10 may be provided for each area. The power network 10 may be a microgrid. The power network 10 may be a distribution network of any scale that connects between electric equipment which consumes electricity and a power supply. For example, the power network 10 may be a distribution network provided in any facility such as a commercial facility. The power network 10 may be provided for each building. The vehicle 30, the stationary battery 14, the charging/discharging facility 20, and the power generation facility 12 are connected to the power network 10. The charging/discharging facility 20, the stationary battery 14, and the power generation facility 12 can transmit and receive power to/from the power network 10.

The power generation facility 12 is managed by an electric power company or the like. The charging/discharging facility 20 is a charger/discharger installed in each parking frame of parking lots 140a and 140b. The parking lot 140a is a parking lot managed by the power aggregator. The parking lot 140b is a parking lot added to a facility 150 such as a shopping mall, an apartment, a building, and the like. The parking lot 140b is managed by a manager of the facility 150. Note that the parking lot 140a is provided with a fee adjustment machine 142a for collecting a usage fee for the parking lot 140a. The parking lot 140b is provided with a fee adjustment machine 142b for collecting a usage fee for the parking lot 140b. In the present embodiment, the fee adjustment machines 142a and 142b may be collectively referred to as "the fee adjustment machine(s) 142."

The vehicle 30 can be connected to the charging/discharging facility 20 through a charging/discharging cable 22 while being parked in the parking lot 140. That is, the vehicle 30 can be connected to the power network 10 through the charging/discharging cable 22 and the charging/discharging facility 20. The vehicle 30 transmits and receives power between the battery 32 and the power network 10 through the charging/discharging facility 20. For example, the vehicle 30 releases power obtained by discharge from the battery 32 to the power network 10 via the charging/discharging cable 22 and the charging/discharging facility 20. The vehicle 30 also charges the battery 32 with power supplied from the power network 10 via the charging/discharging cable 22 and the charging/discharging facility 20. Note that the transmission and reception of power to/from the power network 10 may be referred to as "the power transmission and reception with the power network 10."

The stationary battery 14 is managed by a power aggregator. The battery 32 of the vehicle 30 forms a virtual power plant with the stationary battery 14. The management server 40 is managed by the power aggregator. The management server 40 controls power transmission and reception between the battery 32 and the power network 10, and between the stationary battery 14 and the power network 10.

The management server 40 carries out power transactions by bidding at a wholesale power market. The power transaction server 50 is managed by an operator of the wholesale power market. The management server 40 places a bid in a 30-minute time frame in the power transaction server 50. The management server 40, based on a contract result, causes the battery 32 and the stationary battery 14 to discharge power in every time frame to supply the power to the power network 10.

For example, the management server 40, according to a contract amount for the bidding by the power aggregator in the wholesale power market, causes the battery 32 and the stationary battery 14 to discharge power to supply the power to the power network 10. In addition, the management server 40 controls charging/discharging of the battery 32 and the stationary battery 14 to balance the power supply and demand in the power network 10 to an extent of balancing power contracted for the bidding by the power aggregator in the supply/demand balancing market. For example, the management server 40 controls charging/discharging of the battery 32 and the stationary battery 14 according to an increased-demand response (increased-DR), a decreased-demand response (decreased-DR), and an increased/decreased-demand response (increased/decreased-DR) from an electricity transmission and distribution utility or an electricity retailer.

For example, the management server 40 controls at least one of the vehicle 30 and the charging/discharging facility 20 according to the increased-DR to charge the battery 32 of the vehicle 30 with power received from the power network 10 through the charging/discharging facility 20. The management server 40 also controls at least one of the vehicle 30 and the charging/discharging facility 20 according to the decreased-DR to cause the battery 32 of the vehicle 30 to discharge power so as to release the power discharged from the battery 32 toward the power network 10 through the charging/discharging facility 20.

In the present embodiment, the management server 40 sets the usage fee for the parking lot 140 based on the contract result. For example, the management server 40, when a contract is made on the bidding for a specific time frame on the next day, discounts the usage fee for the parking lot 140 during a time slot including the time frame on the next day according to a contract price and a contract amount.

The management server 40 notifies the user terminal 82 of information indicating the time slot on the next day when a discount is applied and the discounted usage fee. Moreover, when the vehicle 30 is parked in the parking lot 140, the user terminal 82 is notified of information that the usage fee for the parking lot 140 is discounted by connecting to the charging/discharging facility 20. Thereby, many vehicles 30 can be guided to be connected to the power network 10.

The facility 150 is provided with a battery 152. The battery 152 is connected to the charging/discharging facility 20 of the parking lot 140b. The battery 152 can transmit and receive power to/from the charging/discharging facility 20 of the parking lot 140b. For example, the battery 152 may be charged with power supplied from the vehicle 30 parked in the parking lot 140b via the charging/discharging facility 20 of the parking lot 140b. Also, power acquired by discharge from the battery 152 is supplied to the vehicle 30 parked in the parking lot 140b via the charging/discharging facility 20 of the parking lot 140b to be used for charging the battery 32. The battery 152 can transmit and receive power to/from the power network 10. Charging/discharging of the battery 152 may be controlled by the management server 40, or may be managed by an administrator of the facility 150 or other power aggregators contracted by the administrator. Note that, when the usage fee for the parking lot 140b is discounted, the management server 40 may generate payment information to set that a discounted amount of money is paid to the administrator of the facility 150.

Note that, in the present embodiment, the power transmission and reception means that the power is transmitted and received from at least one of the vehicle 30 and the power network 10 to the other. For example, the power transmission and reception may mean that power is released from the vehicle 30 toward the power network 10. The power transmission and reception may also mean that power is transmitted from the power network 10 toward the vehicle 30. Note that, in the case where power is released from the vehicle 30 through a charger/discharger installed at a power consumer such as a home, if the power consumption on the power consumer side is greater than the amount of power released from the vehicle 30, no net power may be supplied to the power network 10 at a connection point between the power consumer side and the power network 10, and the amount of power supply from the connection point to the power consumer may simply decrease. This case can also be considered that, as seen from the perspective of the power network 10, power is exchanged with the outside of the power network 10. Accordingly, in the present embodiment, in the power transmission and reception with the power network 10 by releasing the power from the vehicle 30, it does not matter whether the power network 10 receives net power from a particular connection point with the vehicle 30.

Figure 2:
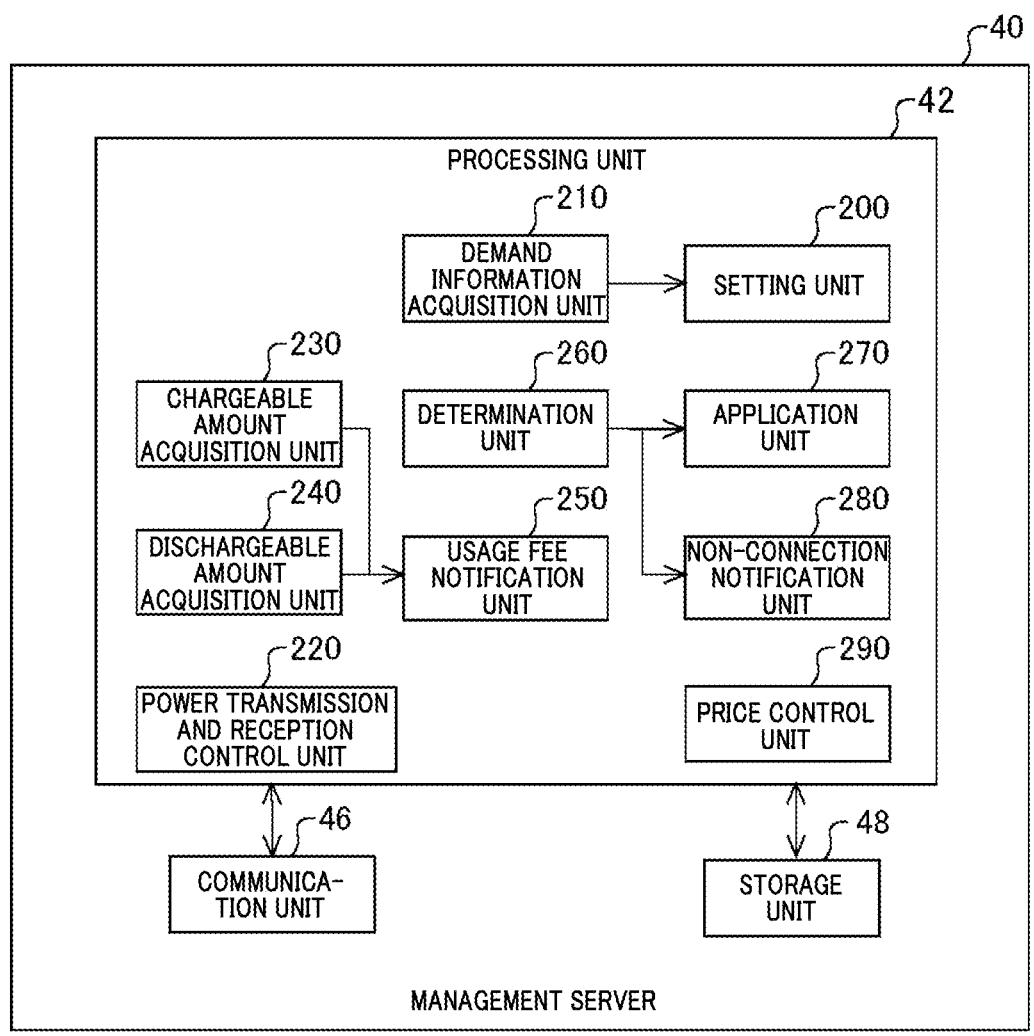
FIG. 2 shows schematically a functional configuration of a management server 40.

FIG. 2 shows schematically a functional configuration of the management server 40. The management server 40 comprises a processing unit 42, a storage unit 48, and a communication unit 46.

The processing unit 42 is implemented by a processing device including a processor. The storage unit 48 is implemented by a non-volatile storage device. The communication unit 46 is responsible for communication among the vehicle 30, the stationary battery 14, the user terminal 82, and the power transaction server 50. Information received by the communication unit 46 from the vehicle 30, the stationary battery 14, the user terminal 82, and the power transaction server 50 is supplied to the processing unit 42. In addition, information transmitted to the vehicle 30, the stationary battery 14, the user terminal 82, and the power transaction server 50 is generated by the processing unit 42 and transmitted via the communication unit 46.

The management server 40 may be a system implemented in a single information processing device or in a plurality of information processing devices.

The processing unit 42 comprises a demand information acquisition unit 210, a setting unit 200, a power transmission and reception control unit 220, a chargeable amount acquisition unit 230, a dischargeable amount acquisition unit 240, a usage fee notification unit 250, a determination unit 260, an application unit 270, a non-connection notification unit 280, and a price control unit 290.

The demand information acquisition unit 210 acquires information indicating power demand in the power network 10. The setting unit 200, based on the power demand, sets the usage fee for the parking lot 140 provided with the charging/discharging facility 20. The phrase "set the usage fee for the parking lot 140" may mean to set information for determining the usage fee for the parking lot 140. For example, the setting unit 200 may set a discount sum to be discounted from a default usage fee for the parking lot 140. Note that the charging/discharging facility 20 is an example of a power transmission and reception facility for transmitting and receiving power between the vehicle 30 and the power network 10. Here, the power transmission and reception facility is an example of an electric facility for accumulating energy in the power supply for driving provided in the vehicle 30.

The contract amount in power transaction described above is an example of information indicating the power demand. The information indicating the power demand may be a contract price in power transaction or a contract type indicating whether a transaction is a buy contract or a sell contract. In addition, the information indicating the power demand may be information indicating an amount of real-time imbalance between supply and demand in the power network 10, or may be information indicating a predicted amount of future imbalance between supply and demand. The information indicating the power demand may be information indicating an amount of real-time power consumption of the power consumer in the power network 10 or a predicted value of the power consumption. As the information indicating the power demand, various types of information, aside from the amounts of power themselves, that directly or indirectly affect the power demand are applicable such as temperature information, humidity information, weather information, and event information.

Note that examples of the power transaction market can include transaction markets such as a day-ahead market, an intraday market, and a supply/demand balancing power market. As the transaction form of power transaction, various transaction forms are applicable other than the transaction forms in these power transaction markets.

The determination unit 260 determines whether the vehicle 30 parked in the parking lot 140 is connected to the charging/discharging facility 20. The application unit 270 applies the usage fee set by the setting unit 200 when the vehicle 30 parked in the parking lot 140 is connected to the charging/discharging facility 20, or a predetermined usage fee when the vehicle 30 parked in the parking lot 140 is not connected to the charging/discharging facility 20.

The non-connection notification unit 280, when the vehicle 30 parked in the parking lot 140 is not connected to the charging/discharging facility 20, notifies the user 80 of the vehicle 30 parked in the parking lot 140 that the vehicle 30 parked in the parking lot 140 is not connected to the charging/discharging facility 20.

The demand information acquisition unit 210 may acquire information indicating power demand per hour in the power network 10. The setting unit 200 may set the usage fee per hour based on the power demand per hour in the power network 10. For example, the setting unit 200 may, when the power demand in the power network 10 is larger than a predetermined value, set the usage fee based on the power demand for the vehicle 30 provided with the battery having a dischargeable amount of power equal to the predetermined value or larger. The setting unit 200 may, when the power demand in the power network 10 is smaller than a predetermined value, set the usage fee based on the power demand for the vehicle 30 provided with the battery having a chargeable amount of power equal to the predetermined value or larger.

The demand information acquisition unit 210 may acquire information indicating a transaction price of power transaction for the power network 10. The setting unit 200 may set the usage fee based on the transaction price.

The chargeable amount acquisition unit 230 acquires information from the vehicle 30 not parked in the parking lot 140 indicating a chargeable amount of power to the battery provided in the vehicle 30. The dischargeable amount acquisition unit 240 acquires information from the vehicle 30 not parked in the parking lot 140 indicating a dischargeable amount of power from the battery provided in the vehicle 30.

The usage fee notification unit 250 notifies the usage fee set by the setting unit 200 to the user 80 of the vehicle 30 not parked in the parking lot 140. The usage fee notification unit 250 may, as the power demand in the power network 10 gets smaller, notifies the usage fee preferentially to the user 80 of the vehicle 30 provided with the battery having a larger chargeable amount of power. The usage fee notification unit 250 may, as the power demand in the power network 10 gets larger, notifies the usage fee preferentially to the user 80 of the vehicle 30 provided with the battery having a larger dischargeable amount of power.

The power transmission and reception control unit 220 causes at least some of the vehicles 30 parked in the parking lot 140 to transmit and receive power to/from the power network 10 depending on the power demand in the power network 10. For example, the power transmission and reception control unit 220 instructs an ECU provided in the vehicle 30 to charge/discharge the battery 32. The ECU in the vehicle 30 follows the instruction from the power transmission and reception control unit 220 to communicate with the charging/discharging facility 20 and control a power converter of the vehicle 30 so as to charge the battery 32 through the charging/discharging facility 20 or release power obtained from discharging the battery 32. Note that the power transmission and reception control unit 220 may successively acquire, from the ECU in the vehicle 30, information indicating an amount of input power from the charging/discharging facility 20 to the power converter upon charging the battery 32, an amount of output power from the power converter to the charging/discharging facility 20 upon discharging the battery 32, and an SOC (State of Charge) of the battery 32. The power transmission and reception control unit 220 may control power transmission and reception between the vehicle 30 and the power network 10 based on the information acquired from the ECU in the vehicle 30.

The price control unit 290 gives the user 80 of the vehicle 30 a price for power transmission and reception between the vehicle 30 and the power network 10. For example, the price control unit 290 pays the user 80 of the vehicle 30 an amount of money according to the amount of power supplied from the vehicle 30 to the power network 10 by the control of the power transmission and reception control unit 220. For example, the price control unit 290 charges the user 80 of the vehicle 30 an amount of money according to the amount of power supplied from the power network 10 to the vehicle 30 by the control of the power transmission and reception control unit 220. The price for power transmission and reception to/from the power network 10 is determined independently from the usage fee for the parking lot 140.

Since the usage fee for the parking lot 140 is set depending on the power demand, the management server 40 can guide the vehicle 30 to be connected to the power network 10 depending on the power demand. As such, it facilitates the power aggregator to ensure the amount of power to be supplied to the power network 10.

Note that the functions of the power transmission and reception management apparatus may be implemented by the management server 40 alone or may be implemented by a combination of the management server 40 and the ECU in the vehicle 30. For example, at least a part of processing to be executed by the management server 40 may be executed by the ECU in the vehicle 30. For example, at least a part of functions to be implemented by the demand information acquisition unit 210, the setting unit 200, the power transmission and reception control unit 220, the chargeable amount acquisition unit 230, the dischargeable amount acquisition unit 240, the usage fee notification unit 250, the determination unit 260, the application unit 270, the non-connection notification unit 280, the price control unit 290, and the storage unit 48 may be implemented by the ECU in the vehicle 30.

FIG. 3 shows a table of an example of usage fee information including the discount sum of the usage fee for the parking lot. The usage fee information is stored in the storage unit 48. The usage fee information corresponds a parking lot ID, a target period, a discount sum, and an application condition to each other.

The parking lot ID stores the identification information of the parking lot 140. The target period stores start time and end time of a discount target period. The discount sum stores information indicating the amount of money to be discounted. The application condition stores information indicating an application condition of discount.

The setting unit 200 determines the parking lot 140 for the discount target, the discount target period, the discount sum, and the application condition based on the contract result information stored in the storage unit 48. The contract result information includes, for example, area information indicating an area of power transaction, time frame information indicating a time frame in which a bid is placed, contract price information indicating a contract price, contract amount information indicating a contract amount, and contract type information indicating a contract type.

The setting unit 200 determines the parking lot 140 as the discount target of the usage fee based on the area information. The setting unit 200 determines the parking lot 140 in the area indicated by the area information as the parking lot for the discount target of the usage fee.

In addition, the setting unit 200 determines the discount target period based on the time frame information. For example, the setting unit 200 determines the start time and the end time of the discount target period so as to include a 30-minute time frame indicated by the time frame information.

In addition, the setting unit 200 determines the discount sum of the usage fee for each parking lot 140 based on at least one of the contract price and the contract amount. For example, the setting unit 200 sets a higher discount sum for a higher contract price. The setting unit 200 may set a higher discount sum for a larger contract amount.

The setting unit 200 sets the application condition based on the contract type. The setting unit 200 sets the application condition to "large dischargeable amount" when the contract type is the sell contract. The "large dischargeable amount" indicates that the dischargeable amount of power from the battery 32 equals to a predetermined threshold or larger. On the other hand, the setting unit 200 sets the application condition to "large chargeable amount" when the contract type is the buy contract. The "large chargeable amount"

indicates that the chargeable amount of power to the battery 32 equals to the predetermined threshold or larger.

The dischargeable amount of power from the battery 32 may be a residual capacity of the battery 32, or may be a capacity obtained by subtracting a certain capacity from the residual capacity of the battery 32. The chargeable amount of power to the battery 32 may be a difference in capacity between a full charge capacity of the battery 32 and the residual capacity of the battery 32, or may be a capacity obtained by subtracting a certain capacity from the residual capacity of the battery 32.

For the battery 32, a chargeable/dischargeable battery capacity frame may be set under control of the charging/discharging facility 20. In this case, the dischargeable amount of power from the battery 32 may be the dischargeable amount of power within the battery capacity frame. The chargeable amount of power to the battery 32 may be the chargeable amount of power within the battery capacity frame.

Figure 4:
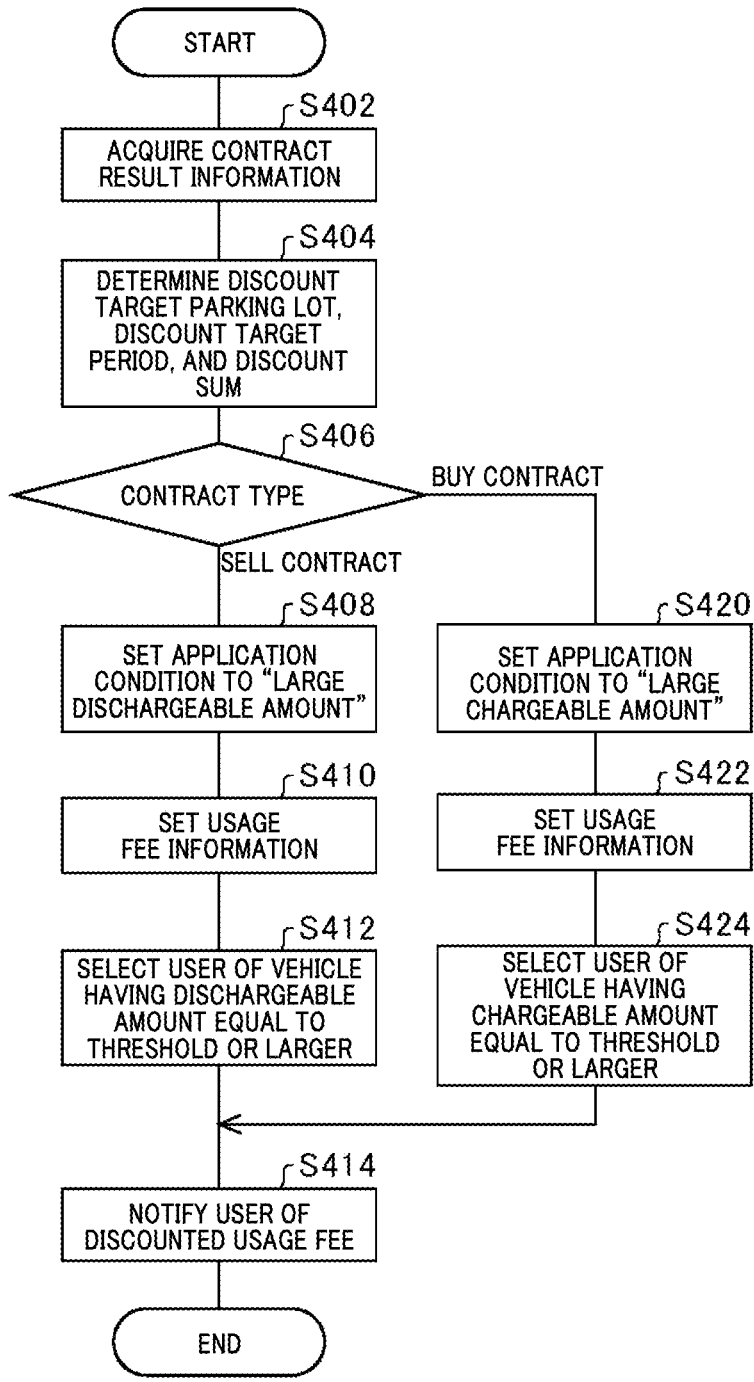
FIG. 4 is a flowchart relating to processing of notifying a user 80 of the usage fee for a parking lot 140 based on contract result information.

FIG. 4 is a flowchart relating to processing of notifying the user 80 of the usage fee for the parking lot 140 based on the contract result information. The flowchart in FIG. 4 is executed mainly in the processing unit 42 of the management server 40. The processing of the flowchart is executed to set the usage fee for the parking lot 140 on the next day when the contract result is acquired for the power transaction in a day-ahead market, for example.

At S402, the demand information acquisition unit 210 acquires the contract result information from the storage unit 48. The contract result information includes the area information, the time frame information, the contract price information, the contract amount information, and the contract type information.

At S404, the setting unit 200 determines the discount sum and the discount target period of the usage fee for the parking lot 140 based on the time frame information, the contract price information, and the contract amount information.

At S406, the setting unit 200 determines whether the contract is sell or buy contract based on the contract type included in the contract result information. If it is the sell contract, at S408, a discount application condition is set to "large dischargeable amount."

At S410, the setting unit 200 sets the information determined at S404 and S408 to the usage fee information.

At S412, the usage fee notification unit 250 selects the user of the vehicle 30 provided with the battery 32 having the dischargeable amount of power equal to the threshold or larger. For example, the usage fee notification unit 250 selects the battery 32 having the dischargeable amount of power equal to the threshold or larger based on the dischargeable amount of power of the battery 32 provided in each vehicle 30 acquired by the dischargeable amount acquisition unit 240. The usage fee notification unit 250 selects the user 80 of the vehicle 30 having the selected battery 32.

Note that the usage fee notification unit 250 may select the user 80 based on a location of the parking lot 140 as the discount target and geographical information relating to the user 80. Position information relating to the user 80 can include a location of a home of the user 80, a location of an office of the user 80, a current location of the user 80, and the like. The position information relating to the user 80 may be preliminarily registered in the management server 40. As the current location of the user 80, a location of the user terminal 82 or a location of the vehicle 30 may be applied.

At S414, the usage fee notification unit 250 transmits information indicating the location of the parking lot 140 as the discount target, the discount target period, and the discount sum to the user terminal 82 of the user 80 selected at S412.

If it is determined that the contract type is the sell contract at S406, the discount application condition is set to "large chargeable amount" at S420.

At S422, the setting unit 200 sets the information determined at S404 and S420 to the usage fee information.

At S424, the usage fee notification unit 250 selects the user of the vehicle 30 provided with the battery 32 having the chargeable amount of power equal to the threshold or larger. For example, the usage fee notification unit 250 selects the battery 32 having the chargeable amount of power equal to the threshold or larger based on the chargeable amount of power of the battery 32 provided in each vehicle 30 acquired by the chargeable amount acquisition unit 230. The usage fee notification unit 250 selects the user 80 of the vehicle 30 having the selected battery 32. Note that, as described above, the usage fee notification unit 250 may select the user 80 based on the location of the parking lot 140 as the discount target and the geographical information relating to the user 80.

After the processing at S424, the processing proceeds to S414 where the usage fee notification unit 250 transmits information indicating the location of the parking lot 140 as the discount target, the discount target period, and the discount sum to the user terminal 82 of the user 80 selected at S424.

Thereby, the vehicle 30 having a desirable chargeable/dischargeable amount can be guided to the parking lot 140 during a desirable time slot to be connected to the power network 10 depending on the power demand in the power network 10.

Figure 5:
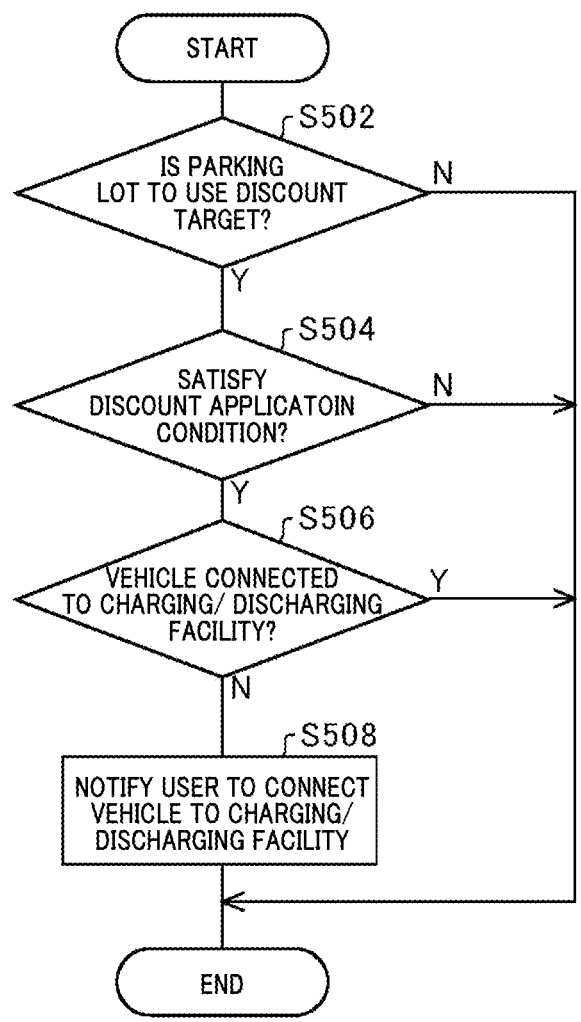
FIG. 5 is a flowchart relating to processing of notifying the usage fee in using the parking lot.

FIG. 5 is a flowchart relating to processing of notifying the usage fee in using the parking lot. The processing of the flowchart in FIG. 5 is executed mainly in the processing unit 42 of the management server 40. The processing of the flowchart in FIG. 5 is executed when the user 80 uses the parking lot 140. For example, the processing of the flowchart in FIG. 5 is executed when the user 80 parks the vehicle 30 in the parking lot 140 or when the user 80 performs a procedure to start use of the parking lot 140.

At S502, the determination unit 260 determines whether the parking lot 140 in which the vehicle 30 is parked is the discount target of the usage fee based on the usage fee information stored in the storage unit 48. For example, the determination unit 260 determines that the parking lot 140 is the discount target of the usage fee if a parked location of the vehicle 30 acquired from the vehicle 30 is in the site of the parking lot 140 and a current time is within the discount target period corresponded to the identification information of the parking lot 140. Note that the determination unit 260 may specify the parking location of the vehicle 30 based on a traveling status and the position information of the vehicle 30 transmitted successively from the vehicle 30 to the management server 40.

If the parking lot 140 is the discount target of the usage fee, at S504, the determination unit 260 determines whether the vehicle 30 parked in the parking lot 140 satisfies the discount application condition. For example, the determination unit 260 determines whether the vehicle 30 satisfies the discount application condition by determining whether the chargeable amount acquired from the chargeable amount acquisition unit 230 is equal to the predetermined threshold or larger, or whether the dischargeable amount acquired from the dischargeable amount acquisition unit 240 is equal to the predetermined threshold or larger.

If the application condition is satisfied, at S506, the determination unit 260 determines whether the vehicle 30 is connected to the charging/discharging facility 20. For example, the determination unit 260 determines whether the vehicle 30 is connected to the charging/discharging facility 20 through the charging/discharging cable 22 based on the information acquired from the ECU in the vehicle 30.

If the vehicle 30 is not connected to the charging/discharging facility 20, the non-connection notification unit 280 calculates the usage fee to be charged when the vehicle 30 is connected to the charging/discharging facility 20 by subtracting the discount sum corresponded to the identification information of the parking lot 140 in the usage fee information from the default usage fee, and suggests the usage fee to the user 80. Also, the non-connection notification unit 280 notifies the user 80 to connect the vehicle 30 to the charging/discharging facility 20. This can encourage the vehicle 30 to be made available to transmit and receive power to/from the power network 10.

Note that if it is determined at S502 that the parking lot 140 in which the vehicle 30 is parked is not the discount target of the usage fee, the processing of this flowchart is terminated. If it is determined at S504 that the vehicle 30 does not satisfy the discount application condition, the processing of this flowchart is terminated. Also, at S506, if the vehicle 30 is connected to the charging/discharging facility 20, the processing of this flowchart is terminated.

According to the processing shown in FIG. 4 and FIG. 5, in an area in the power network 10 where a power shortage is predicted, the vehicle 30 having the large dischargeable amount can be guided to the parking lot 140 and the vehicle 30 is also guided to be made available to transmit and receive power to/from the power network 10. In addition, in an area in the power network 10 where a power surplus is predicted, the vehicle 30 having the large chargeable amount can be guided to the parking lot 140 and the vehicle 30 is also guided to be made available to transmit and receive power to/from the power network 10. This facilitates the power aggregator to ensure the amount of power required for transmitting power to the power network 10 or receiving power from the power network 10.

FIG. 6 shows a table of an example of connection history information indicating history of connection by the vehicle 30 to the power network 10. The connection history information is stored in the storage unit 48. The connection history information corresponds the vehicle ID, a connection destination ID, connection start time, connection end time, and a power transmission and reception amount to each other.

The vehicle ID stores the identification information of the vehicle 30. The connection destination ID stores the identification information of the charging/discharging facility 20. Note that the identification information of the charging/discharging facility 20 is associated with the identification information of the parking lot 140. The application unit 270 can specify the parking lot 140 used by the vehicle 30 based on the identification information of the charging/discharging facility 20 stored in the connection destination ID.

The connection start time stores time when the vehicle 30 is made available to transmit and receive power to/from the power network 10. The connection start time may be specified based on the power transmission and reception propriety information transmitted regularly from the charging/discharging ECU in the vehicle 30 to the management server 40. The connection start time may store time when the power transmission and reception control unit 220 is made available to control charging/discharging of the battery 32 after the charging/discharging cable 22 is attached to the vehicle 30 and the charging/discharging facility 20.

The connection end time stores time when power transmission and reception between the vehicle 30 and the power network 10 is made unavailable. The connection end time may be specified based on the power transmission and reception propriety information transmitted regularly from the charging/discharging ECU in the vehicle 30 to the management server 40. The connection end time may store end time of the period in which the vehicle 30 is connected to the charging/discharging facility 20 through the charging/discharging cable 22. The connection end time may store time when the power cable is disconnected from at least one of the vehicle 30 and the charging/discharging facility 20. The connection end time may store time when the power transmission and reception control unit 220 is made unavailable to control charging/discharging of the battery 32.

The power transmission and reception amount stores a net amount of power transmitted and received between the vehicle 30 and the power network 10 during the period from the connection start time to the connection end time. The price control unit 290, based on each power transmission and reception amount of the vehicles 30, produces price information for transmitting and receiving power to/from the power network 10 and store the price information in the storage unit 48.

For example, when a net amount of power transmission from the vehicle 30 to the power network 10 is positive, the price control unit 290 produces amount of money information payable to each user 80 of the vehicle 30 and corresponds the amount of money information to the user 80 for storage in the storage unit 48. The price control unit 290 may calculate a payable amount to each user 80 of the vehicle 30 based on the power transmission and reception amount and a power buying unit price. The power buying unit price is a price per unit amount of power the power aggregator buys from the user 80.

When a net amount of power transmission from the vehicle 30 to the power network 10 is negative, the price control unit 290 produces amount of money information to be charged to each user 80 of the vehicle 30 and corresponds the amount of money information to the user 80 for storage in the storage unit 48. The price control unit 290 may calculate the amount of money to be charged for each user 80 of the vehicle 30 based on the power transmission and reception amount and a power selling unit price. The power selling unit price is a price per unit amount of power the power aggregator sells to the user 80.

Note that the connection history information is not information to specify whether the vehicle 30 actually transmitted and received power to/from the power network 10, but information to specify whether the vehicle 30 has been available to transmit and receive power to/from the power network 10. The connection history information may be any form of information as long as it can specify whether the vehicle 30 has been available to transmit and receive power to/from the power network 10.

Figure 7:
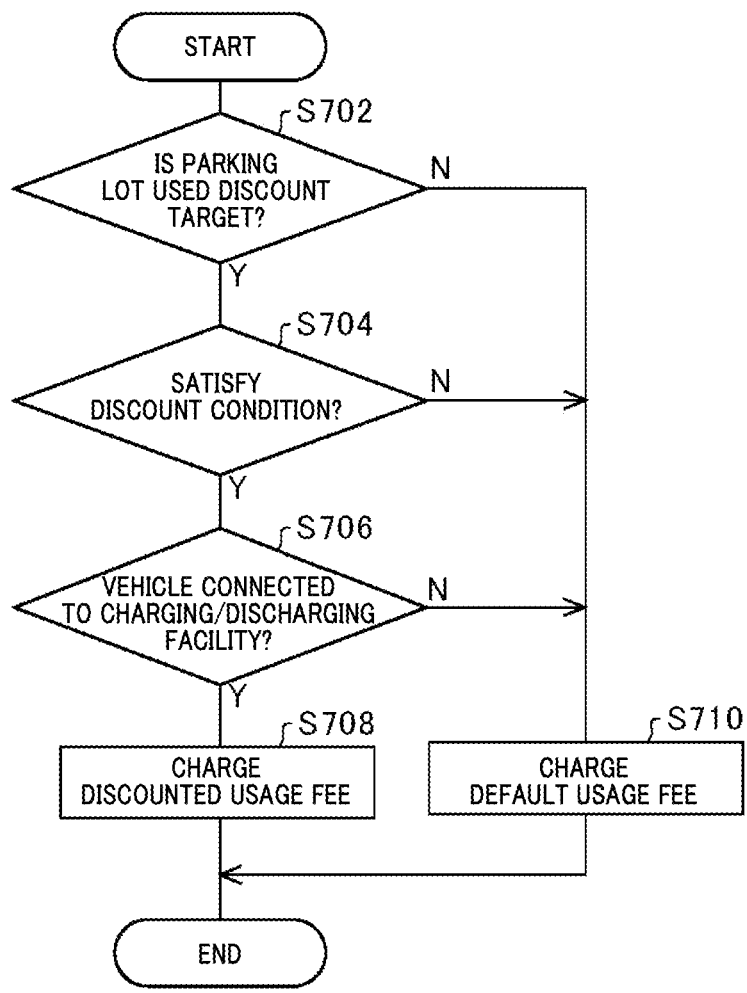
FIG. 7 is a flowchart relating to processing of fixing the usage fee for the parking lot 140.

FIG. 7 is a flowchart relating to processing of fixing the usage fee for the parking lot 140. The processing of the flowchart in FIG. 7 is executed mainly in the processing unit 42 of the management server 40. The processing of the flowchart in FIG. 7 is executed when the user 80 ends using the parking lot 140. For example, the processing of the flowchart in FIG. 7 is executed when an unloading operation of the vehicle 30 is performed.

At S702, the determination unit 260 determines whether the parking lot 140 used by the user 80 is the discount target of the usage fee based on the usage fee information stored in the storage unit 48. For example, the user 80, when paying the usage fee through the fee adjustment machine 142, causes the user terminal 82 to recognize identification information of the fee adjustment machine 142, and then the user terminal 82 transmits the respective identification information of the user 80, the fee adjustment machine 142, and the parking lot 140 to the management server 40. The determination unit 260 refers to the usage fee information to determine that the parking lot 140 is the discount target of the usage fee if there is the usage information corresponded to the received identification information of the parking lot 140 and at least a part of a parked period of the vehicle 30 is included in the discount target period corresponded to the identification information of the parking lot 140.

If the parking lot 140 is the discount target of the usage fee, at S704, the determination unit 260 determines whether the vehicle 30 parked in the parking lot 140 satisfies the discount application condition. For example, the determination unit 260 determines whether the vehicle 30 satisfies the discount application condition by determining whether the chargeable amount of the vehicle 30 is equal to the predetermined threshold or larger when the vehicle 30 is parked in the parking lot 140, or whether the dischargeable amount of the vehicle 30 is equal to the predetermined threshold or larger when the vehicle 30 is parked in the parking lot 140.

If the application condition is satisfied, at S706, the determination unit 260 determines whether the vehicle 30 is connected to the charging/discharging facility 20. For example, the determination unit 260 determines whether the vehicle 30 is connected to the charging/discharging facility 20 through the charging/discharging cable 22 based on the connection information shown in FIG. 6.

If the vehicle 30 is connected to the charging/discharging facility 20, the application unit 270 charges, as the usage fee for the parking lot 140, the amount of money calculated by subtracting the discount sum corresponded to the identification information of the parking lot 140 and stored in the usage fee information from the default usage fee for the parking lot 140. For example, the application unit 270 notifies the fee adjustment machine 142 of the amount of money calculated by subtracting the discount sum from the default usage fee to charge the user 80.

Note that if it is determined at S702 that the parking lot 140 the user 80 uses is not the discount target of the usage fee, at S710, the application unit 270 notifies the fee adjustment machine 142 to charge the default usage fee for the parking lot 140 and the processing of this flowchart is terminated. Also, if it is determined at S704 that the vehicle 30 does not satisfy the discount application condition, the processing of S710 is performed and the processing of this flowchart is terminated. Also, if it is determined at S706 that the vehicle 30 is not connected to the charging/discharging facility 20, the processing of S710 is performed and the processing of this flowchart is terminated.

As described above, the power transmission and reception system 100, depending on the power demand of the power network 10 in each area, guides the vehicle 30 having the desirable chargeable/dischargeable amount to the parking lot 140 so that the vehicle 30 is made available to transmit and receive power to/from the power network 10. This facilitates the power aggregator to ensure the amount of power to be supplied to the power network 10. Thus, a balancing power can be reduced which should be preliminarily ensured to stabilize the power network 10.

Figure 8:
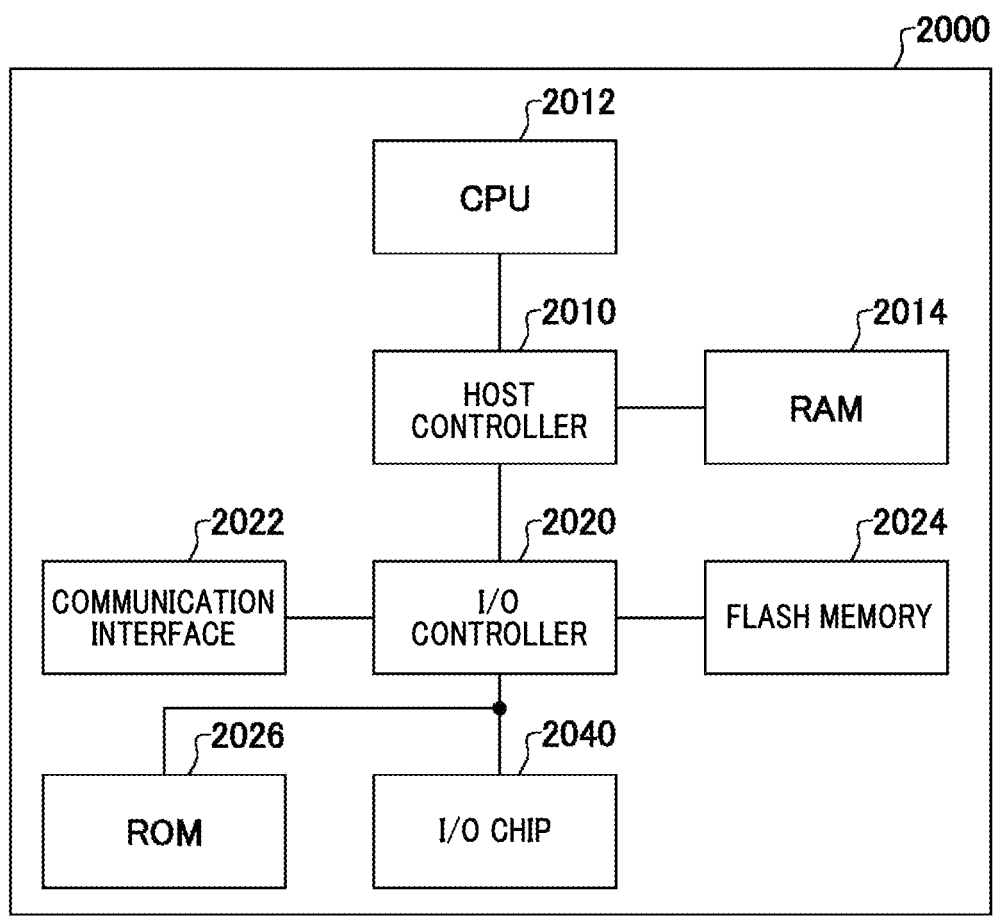
FIG. 8 shows an exemplary computer 2000 in which a plurality of embodiments of the present invention may be wholly or partially embodied.

FIG. 8 shows an exemplary computer 2000 in which a plurality of embodiments of the present invention may be wholly or partially embodied. A program installed in the computer 2000 can cause the computer 2000 to function as an apparatus such as the management server 40 or each part of the apparatus according to the embodiments, perform operations associated with the apparatus or each part of the apparatus, and/or perform a process or steps of the process according to the embodiments. Such a program may be executed by a CPU 2012 to cause the computer 2000 to perform specific operations associated with some or all of the blocks in the processing steps and block diagrams described in the specification.

The computer 2000 according to the present embodiment includes the CPU 2012 and a RAM 2014, which are connected to each other via a host controller 2010. The computer 2000 also includes a ROM 2026, a flash memory 2024, a communication interface 2022, and an I/O chip 2040. The ROM 2026, the flash memory 2024, the communication interface 2022, and the I/O chip 2040 are connected to the host controller 2010 via an I/O controller 2020.

The CPU 2012 operates in accordance with a program stored in the ROM 2026 and the RAM 2014, thereby controlling each unit.

The communication interface 2022 communicates with other electronic devices via a network. The flash memory 2024 stores a program and data used by the CPU 2012 in the computer 2000. The ROM 2026 stores a boot program or the like executed by the computer 2000 upon activation, and/or a program dependent on hardware of the computer 2000. The I/O chip 2040 may also connect various I/O units, such as a keyboard, a mouse, and a monitor, to the I/O controller 2020 via I/O ports, such as a serial port, a parallel port, a keyboard port, a mouse port, a monitor port, an USB port, an HDMI (registered trademark) port, or the like.

The program is provided via a computer-readable medium, such as a CD-ROM, a DVD-ROM, and a memory card, or a network. The RAM 2014, the ROM 2026, or the flash memory 2024 are an example of the computer-readable medium. The program is installed in the flash memory 2024, the RAM 2014, or the ROM 2026, and executed by the CPU 2012. Such a program describes information processing, which is read out by the computer 2000 to link the program with the various types of hardware resources as mentioned above. The apparatus or method may be configured by implementing information operation or processing using the computer 2000.

For example, upon communication between the computer 2000 and an external device, the CPU 2012 may execute a communication program loaded in the RAM 2014 and, based on the processing described in the communication program, instruct the communication interface 2022 to perform communication processing. The communication interface 2022, under control of the CPU 2012, reads out transmission data stored in a transmission buffer processing area provided in a recording medium such as the RAM 2014 and the flash memory 2024, transmits the read-out transmission data to a network, and writes received data from the network in a reception buffer processing area or the like provided on the recording medium.

The CPU 2012 may allow the RAM 2014 to read out all or necessary parts of a file or database stored in a recording medium such as the flash memory 2024, to perform various types of processing for the data stored on the RAM 2014. The CPU 2012 then writes back the processed data in the recording medium.

Various types of information such as various types of programs, data, tables, and databases may be stored in the storage medium for information processing. On the data read out from the RAM 2014, the CPU 2012 may perform various types of processing including various types of operations, information processing, condition determination, conditional branching, unconditional branching, and information retrieval/conversion, which are described anywhere in the specification and specified by an instruction sequence of a program, and write back the result in the RAM 2014. The CPU 2012 may also retrieve information in a file or database in the recording medium. For example, when the recording medium stores a plurality of entries each having a first attribute value associated with a second attribute value, the CPU 2012 may retrieve an entry from the plurality of entries that satisfies a condition where the first attribute value is specified, read out the second attribute value stored in the entry, thereby acquiring the second attribute value associated with the first attribute value that satisfies a predetermined condition.

The programs or software modules described above may be stored on the computer 2000 or a computer-readable medium in the vicinity of the computer 2000. A storage medium such as a hard disk or RAM provided in a server system connected to a dedicated communication network or the Internet is usable as a computer-readable medium. The program stored in the computer-readable medium may be provided to the computer 2000 via the network.

The program installed in the computer 2000 and causes the computer 2000 to function as the management server 40 may operate on the CPU 2012 or the like to cause the computer 2000 to function as each part of the management server 40. The information processing described in these programs are read out by the computer 2000 to function as specific means which embody cooperation of software and various types of hardware resources as described above, including the demand information acquisition unit 210, the setting unit 200, the power transmission and reception control unit 220, the chargeable amount acquisition unit 230, the dischargeable amount acquisition unit 240, the determination unit 260, the application unit 270, the non-connection notification unit 280, and the price control unit 290. In addition, these specific means embody arithmetic operation or processing of information depending on purpose of use of the computer 2000 in the present embodiment to establish the management server 40 specific to the purpose of use.

Various embodiments have been described with reference to the block diagrams or the like. In the block diagrams, the respective blocks may represent: (1) steps of a process for performing operations; or (2) parts of an apparatus having functions to perform operations. A specific step or part may be implemented by a dedicated circuit, a programmable circuit provided with computer-readable instructions stored on a computer-readable medium, and/or a processor provided with computer-readable instructions stored on a computer-readable medium. The dedicated circuit may include a digital and/or analog hardware circuit, or may include an integrated circuit (IC) and/or a discrete circuit. The programmable circuit may include a reconfigurable hardware circuit, including logic operations such as logic AND, logic OR, logic XOR, logic NAND, logic NOR, and the like, as well as memory elements such as a flip-flop, a register, a field programmable gate array (FPGA), and a programmable logic array (PLA).

The computer-readable medium may include any tangible device that can store instructions to be performed by a suitable device, so that the computer-readable medium having instructions stored therein constitutes at least a part of a product including instructions that can be executed to configure means for performing operations specified in the processing steps or block diagrams. Examples of the computer-readable medium may include an electronic storage medium, a magnetic storage medium, an optical storage medium, a magneto-electric storage medium, and a semiconductor storage medium. More specific examples of the computer-readable medium may include a floppy (registered trademark) disk, a diskette, a hard disk, random access memory (RAM), read-only memory (ROM), erasable programmable read-only memory (EPROM or flash memory), electrically-erasable programmable read-only memory (EEPROM), static random access memory (SRAM), compact disc read-only memory (CD-ROM), a digital versatile disk (DVD), a Blu-ray (registered trademark) disk, a memory stick, and an integrated circuit card.

The computer-readable instructions may include assembler instructions, instruction set architecture (ISA) instructions, machine instructions, machine-dependent instructions, microcodes, firmware instructions, state setting data, or any of source codes or object codes described in any combination of one or more programming languages, including object-oriented programming languages, such as Smalltalk (registered trademark), JAVA (registered trademark), or C++, and conventional procedural programming languages, such as C programming languages or similar programming languages.

The computer-readable instructions may be provided to processors or programmable circuits of general-purpose computers, special-purpose computers, or other programmable data processing apparatuses, locally or via local area network (LAN) or wide area network (WAN) such as the Internet, wherein the computer-readable instructions are executed for providing means for performing the operations specified in the described processing steps or block diagrams. The processors include a computer processor, a processing unit, a microprocessor, a digital signal processor, a controller, and a microcontroller.

While the embodiments of the present invention have been described, the technical scope of the invention is not limited to the above-described embodiments. It is apparent to persons skilled in the art that various alterations and improvements can be added to the above-described embodiments. In addition, matters explained about a particular embodiment can be applied to another embodiment as long as such application does not cause technological contradictions. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: power network; 12: power generation facility; 14: stationary battery; 20: charging/discharging facility; 22: charging/discharging cable; 30: vehicle; 32: battery; 40: management server; 42: processing unit; 46:

communication unit; 48: storage unit; 50: power transaction server; 80: user; 82: user terminal 100: power transmission and reception system; 140: parking lot; 142: fee adjustment machine; 150: facility 152: battery; 200: setting unit; 210: demand information acquisition unit; 220: power transmission and reception control unit; 230: chargeable amount acquisition unit; 240: dischargeable amount acquisition unit; 250: usage fee notification unit; 260: determination unit; 270: application unit; 280: non-connection notification unit; 290: price control unit; 2000: computer; 2010: host controller; 2012: CPU 2014: RAM; 2020: I/O controller 2022: communication interface; 2024: flash memory; 2026: ROM; 2040: I/O chip

What is claimed is:

1. A system comprising:
at least one processor;
a demand information acquisition unit configured to acquire, using the at least one processor, information indicating power demand in a power network;
a setting unit configured to, based on the power demand, set, using the at least one processor, a usage fee for a parking lot having a power transmission and reception facility for a vehicle having a battery as a power supply for driving to transmit and receive power to/from the power network;
a chargeable amount acquisition unit configured to, using the at least one processor, acquire information indicating a chargeable amount of the power to the battery;
a dischargeable amount acquisition unit configured to, using the at least one processor, acquire information indicating a dischargeable amount of the power from the battery, wherein
the setting unit is further configured to, using the at least one processor, set an application condition, according to which the usage fee based on the power demand is applied, the application condition including that (i) the dischargeable amount of the power from the battery is equals to or larger than a predetermined first threshold or (ii) the chargeable amount of the power to the battery is equal to or larger than a predetermined second threshold, and
the system further comprises a non-connection notification unit configured, using the at least one processor, (i) when a vehicle parked in the parking lot satisfies the application condition and is not connected to the power transmission and reception facility, to notify a user of the vehicle parked in the parking lot that the vehicle parked in the parking lot is not connected to the power transmission and reception facility, and (ii) when the vehicle parked in the parking lot does not satisfy the application condition, not to notify the user that the vehicle parked in the parking lot is not connected to the power transmission and reception facility, even when the vehicle parked in the parking lot is not connected to the power transmission and reception facility.

2. The system according to claim 1, further comprising:
a determination unit configured to determine, using the at least one processor, whether the vehicle parked in the parking lot is connected to the power transmission and reception facility; and
an application unit configured to, using the at least one processor, apply the usage fee set by the setting unit when the vehicle parked in the parking lot is connected to the power transmission and reception facility, or a predetermined usage fee when the vehicle parked in the parking lot is not connected to the power transmission and reception facility.

3. The system according to claim 2, wherein:
the demand information acquisition unit is configured to, using the at least one processor, acquire information indicating power demand per hour in the power network, and
the setting unit is configured to, using the at least one processor, set the usage fee per hour based on the power demand per hour in the power network.

4. The system according to claim 3, wherein:
the setting unit, when the power demand in the power network is larger than a predetermined first value, is configured to, using the at least one processor, set the usage fee based on the power demand for a vehicle having the battery with the dischargeable amount of the power equal to or larger than a predetermined second value.

5. The system according to claim 4, wherein:
the setting unit, when the power demand in the power network is smaller than a predetermined first value, is configured to, using the at least one processor, set the usage fee based on the power demand for a vehicle having the battery with the chargeable amount of the power equal to or larger than a predetermined second value.

6. The system according to claim 2, wherein:
the application unit is configured to, using the at least one processor, (i) apply the usage fee set by the setting unit when the vehicle parked in the parking lot is connected to the power transmission and reception facility regardless whether or not there is power transmission and reception between the battery and the power network, and (ii) apply the predetermined usage fee when the vehicle parked in the parking lot is not connected to the power transmission and reception facility.

7. The system according to claim 6, wherein:
the demand information acquisition unit is configured to, using the at least one processor, acquire information indicating power demand per hour in the power network, and
the setting unit is configured to, using the at least one processor, set the usage fee per hour based on the power demand per hour in the power network.

8. The system according to claim 7, wherein:
the setting unit, when the power demand in the power network is larger than a predetermined first value, is configured to, using the at least one processor, set the usage fee based on the power demand for a vehicle having the battery with the dischargeable amount of the power equal to or larger than a predetermined second value.

9. The system according to claim 1, wherein:
the demand information acquisition unit is configured to, using the at least one processor, acquire information indicating power demand per hour in the power network, and
the setting unit is configured to, using the at least one processor, set the usage fee per hour based on the power demand per hour in the power network.

10. The system according to claim 9, wherein:
the setting unit, when the power demand in the power network is larger than a predetermined first value, is configured to, using the at least one processor, set the usage fee based on the power demand for a vehicle having the battery with the dischargeable amount of the power equal to or larger than a predetermined second value.

11. The system according to claim 10, wherein:
the setting unit, when the power demand in the power network is smaller than a predetermined first value, is configured to, using the at least one processor, set the usage fee based on the power demand for a vehicle having the battery with the chargeable amount of the power equal to or larger than a predetermined second value.

12. The system according to claim 9, wherein:
the setting unit, when the power demand in the power network is smaller than a predetermined first value, is configured to, using the at least one processor, set the usage fee based on the power demand for a vehicle having the battery with the chargeable amount of the power equal to or larger than a predetermined second value.

13. The system according to claim 1, wherein:
the demand information acquisition unit is configured to, using the at least one processor, acquire information indicating a transaction price of power transaction for the power network, and
the setting unit is configured to, using the at least one processor, set, based on the transaction price, the usage fee based on the power demand.

14. The system according to claim 1, further comprising:
a usage fee notification unit configured to, using the at least one processor, notify the usage fee set by the setting unit to the user of the vehicle not parked in the parking lot.

15. The system according to claim 14, wherein:
the chargeable amount acquisition unit is configured to, using the at least one processor, acquire the information, from the vehicle not parked in the parking lot, indicating the chargeable amount of the power to the battery of the vehicle,
wherein the usage fee notification unit, as the power demand in the power network gets smaller, is configured to, using the at least one processor, notify the usage fee set by the setting unit preferentially to a user of a vehicle having a battery with a larger chargeable amount of the power.

16. The system according to claim 14, wherein:
the dischargeable amount acquisition unit is configured to, using the at least one processor, acquire the information, from the vehicle not parked in the parking lot, indicating the dischargeable amount of the power from the battery of the vehicle,
wherein the usage fee notification unit, as the power demand in the power network gets higher, is configured to, using the at least one processor, notify the usage fee set by the setting unit preferentially to a user of a vehicle having a battery with a larger dischargeable amount of the power.

17. A non-transitory computer-readable storage medium having recorded thereon a program to cause a computer to perform operations comprising:
acquiring information indicating a power demand in a power network;
based on the power demand, setting a usage fee for a parking lot having a power transmission and reception facility for a vehicle having a battery as a power supply for driving to transmit and receive power to/from the power network;
acquiring information indicating a chargeable amount of the power to the battery;
acquiring information indicating a dischargeable amount of the power from the battery;
setting an application condition, according to which the usage fee based on the power demand is applied, the application condition including that (i) the dischargeable amount of the power from the battery is equals to or larger than a predetermined first threshold or (ii) the chargeable amount of the power to the battery is equal to or larger than a predetermined second threshold; and
(i) notifying, when a vehicle parked in the parking lot satisfies the application condition and is not connected to the power transmission and reception facility, a user of the vehicle parked in the parking lot that the vehicle parked in the parking lot is not connected to the power transmission and reception facility, and (ii) not notifying, when the vehicle parked in the parking lot does not satisfy the application condition, the user that the vehicle parked in the parking lot is not connected to the power transmission and reception facility, even when the vehicle parked in the parking lot is not connected to the power transmission and reception facility.

* * * * *